H. VOHLAND.
CYLINDER TOOTH.
APPLICATION FILED JAN. 11, 1913.
1,079,964.
Patented Dec. 2, 1913.
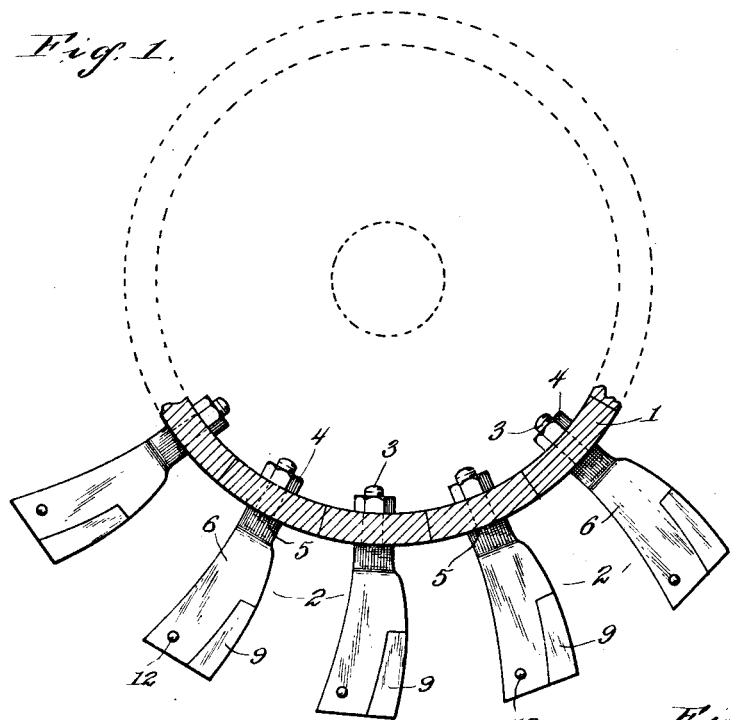
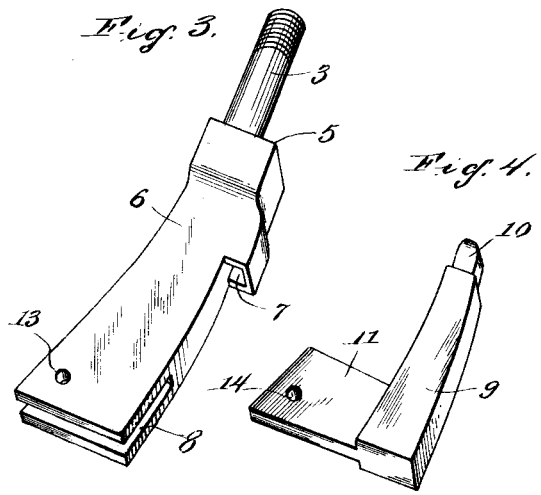
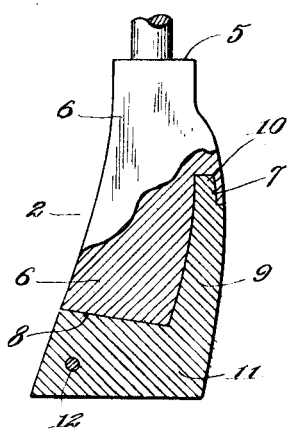
WITNESSES
INVENTOR
Henry Vohland,
by Richard —
his Attorney

UNITED STATES PATENT OFFICE.

HENRY VOHLAND, OF GIBBON, NEBRASKA.

CYLINDER-TOOTH.

1,079,964.  Specification of Letters Patent.  Patented Dec. 2, 1913.

Application filed January 11, 1913. Serial No. 741,566.

*To all whom it may concern:*

Be it known that I, HENRY VOHLAND, a citizen of the United States, residing at Gibbon, in the county of Buffalo and State of Nebraska, have invented new and useful Improvements in Cylinder-Teeth, of which the following is a specification.

My invention relates to an improved construction of tooth for the cylinders of threshing machines and other machines or devices.

In connection with the teeth or blades now used on the cylinders of threshing machines and other machines, the same are usually made of soft steel or softer metal because in use the teeth bend out of proper position and have to be sprung or bent at times back to their proper position. As the tooth is made of soft metal, the work face thereof is accordingly made of soft metal and in time wear away to the extent that substitution of a new one is necessary.

It is an object of my invention to provide in connection with such a tooth a face section that can be made of hard steel and removably fastened to the tooth so that the face, should the same become worn, can be removed for substitution.

Another object of my invention is to provide the removable facing of such construction that the tooth itself may remain fastened to the cylinder while substitution of a new facing section is taking place.

With these and other objects in view, the invention has been embodied in preferable form, which form is illustrated in the drawings accompanying this application to be considered in connection with the description following.

In said drawings:—Figure 1 is a fragmentary cross sectional view through a cylinder showing a number of the teeth in connection therewith. Fig. 2 is a view partly in elevation and partly in longitudinal section showing the attachment of the removable facing member to the main tooth section. Fig. 3 is a perspective view of the main tooth section, and Fig. 4 is a perspective view of the facing section.

Like reference characters designate like or corresponding parts throughout the several views of the drawings.

Referring to the drawings, 1 designates a hollow cylinder such as is used on threshing or other machines or devices.

My improved form of tooth is generally designated 2 and shown attached to said cylinder as by the passage of a shank 3 of the tooth through an opening in the cylinder, the shank provided with a screw threaded portion interior of the cylinder receiving a clamping nut. Through the provision of the shank 3, a shoulder 5 is formed which is adapted to abut against the outer periphery of the cylinder. This shank 3 is provided on a tooth or main tooth section 6. A pocket 7 is provided along one edge of the tooth section 6 and at its outer end is provided with a groove 8.

A separate and removable facing member is employed and generally designated 9. From one end of the facing member extends a lug or projection 10 and adjacent its other end extending at right angles to the lug 10 is a tenon or projection 11. When the members are connected together, facing member 9 is positioned so that lug 10 enters pocket 7 and tenon 11 enters groove 8. This facing member or section is positively fastened to the tooth section 6 by means of a fastening member such as a bolt or rivet 12 which is passed through openings 13 and 14 provided respectively in the tooth section 6 and tenon 11.

In the manufacture of the device, the facing section 9 is made of hard metal such as hard steel and the section 6 is made from a somewhat softer metal so that should the same bend out of proper position, the same can be straightened. The facing 9 permits a working face to be provided which will be of hard metal and accordingly one which will not wear away as easily as a face of metal of the same degree of hardness or temper as the section 6. This facing section also serves to brace section 6 when coupled.

It may be desired to make changes in the details of construction of the device to suit various conditions and for this reason such details as fall within the spirit and scope of the appended claims are reserved.

Having thus described my said invention, what I claim as new and desire to secure by Letters Patent, is:—

1. In combination with a cylinder tooth having its lower end bifurcated and a socket formed in one side thereof, of a removable member having its lower end reduced to form a projection to enter said socket and its upper end provided with an extension to enter the bifurcated end of said tooth, and a fastening member passing through said members for holding the same together and preventing movement of the parts.

2. In combination with a cylinder tooth having its lower end bifurcated to form a pair of spaced apart extensions and having a portion of one side thereof cut away and a socket formed therein, of a removable facing member having its lower end reduced to form a projection to enter said socket and its upper end provided with an extension to engage the extensions of said tooth, the outer edges of said extensions alining with each other, and a fastening member passing through said extensions to positively fasten them together and prevent movement of the parts.

HENRY VOHLAND.

Witnesses:
M. H. DONALSON,
ROSCOE LUNGER.

Copies of this patent may be obtained for five cents each, by addressing the "Commissioner of Patents, Washington, D. C."